US012776504B2

(12) United States Patent
Lee et al.

(10) Patent No.: US 12,776,504 B2
(45) Date of Patent: Oct. 27, 2026

(54) METHOD OF MANUFACTURING MEMBRANE-ELECTRODE-SUBGASKET ASSEMBLY AND ASYMMETRICAL MEMBRANE-ELECTRODE-SUBGASKET ASSEMBLY MANUFACTURED THEREBY

(71) Applicants: Hyundai Motor Company, Seoul (KR); Kia Corporation, Seoul (KR)

(72) Inventors: Han Hyung Lee, Goyang (KR); Young June Park, Gyeonggi-do (KR); Sun Il Kim, Seoul (KR); Seung Ah Yu, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 78 days.

(21) Appl. No.: 17/574,969

(22) Filed: Jan. 13, 2022

(65) Prior Publication Data

US 2023/0008741 A1 Jan. 12, 2023

(30) Foreign Application Priority Data

Jan. 18, 2021 (KR) ........................ 10-2021-0006452

(51) Int. Cl.
*H01M 8/1004* (2016.01)
*H01M 8/0273* (2016.01)

(52) U.S. Cl.
CPC ....... *H01M 8/1004* (2013.01); *H01M 8/0273* (2013.01); *H01M 2250/20* (2013.01)

(58) Field of Classification Search
CPC ............. H01M 8/1004; H01M 8/0273; H01M 8/0286; H01M 4/88
See application file for complete search history.

(56) References Cited

U.S. PATENT DOCUMENTS

| | | | | |
|---|---|---|---|---|
| 8,921,002 | B2 | 12/2014 | Yandrasits et al. | |
| 9,276,284 | B2 * | 3/2016 | Iverson | H01M 8/1004 |
| 9,825,312 | B2 | 11/2017 | Lee | |
| 2003/0221311 | A1 * | 12/2003 | Smith | H01M 8/242 29/623.2 |
| 2009/0023035 | A1 * | 1/2009 | Sasaoka | H01M 8/0267 29/623.2 |
| 2009/0255632 | A1 * | 10/2009 | Park | B32B 39/00 156/353 |
| 2013/0149635 | A1 * | 6/2013 | Hood | H01M 8/1004 29/730 |
| 2017/0069927 | A1 * | 3/2017 | Jeong | B32B 37/0053 |
| 2017/0256810 | A1 * | 9/2017 | Lee | H01M 8/0286 |
| 2020/0194810 | A1 | 6/2020 | Jeong et al. | |
| 2022/0278345 | A1 * | 9/2022 | Cho | H01M 8/0273 |

FOREIGN PATENT DOCUMENTS

| | | | | |
|---|---|---|---|---|
| CN | 103682393 | A | 3/2014 | |
| EP | 3823068 | A1 * | 5/2021 | H01M 8/00 |
| JP | 2019192327 | A | 10/2019 | |
| KR | 10-1575312 | B1 | 12/2015 | |
| KR | 10-2020-0072197 | A | 6/2020 | |

* cited by examiner

*Primary Examiner* — Wyatt P Mcconnell
*Assistant Examiner* — Joshua P Mcclure
(74) *Attorney, Agent, or Firm* — Fox Rothschild LLP

(57) ABSTRACT

Disclosed herein are membrane-electrode-subgasket assembly and a membrane-electrode-subgasket assembly manufactured by the method. The membrane-electrode-subgasket assembly includes substrates having sizes and shapes asymmetric with each other provided on a first and second surfaces thereof.

10 Claims, 13 Drawing Sheets

METHOD OF MANUFACTURING MEMBRANE-ELECTRODE-SUBGASKET ASSEMBLY AND ASYMMETRICAL MEMBRANE-ELECTRODE-SUBGASKET ASSEMBLY MANUFACTURED THEREBY

CROSS REFERENCE TO RELATED APPLICATION

The present application claims priority to Korean Patent Application No. 10-2021-0006452, filed Jan. 18, 2021, the entire contents of which is incorporated herein for all purposes by this reference.

TECHNICAL FIELD

The present invention relates to a membrane-electrode-subgasket assembly and a membrane-electrode-subgasket assembly manufactured by the method. The membrane-electrode-subgasket assembly includes substrates having sizes and shapes asymmetric with each other, which are provided on a first and second surfaces.

BACKGROUND

A fuel cell generates electricity by reacting a fuel with an oxidizing agent. There is a risk that the performance of the fuel cell may deteriorate when the fuel or the oxidizing agent supplied from each electrode is leaked to a counter electrode. Therefore, it is necessary to prevent fuel and an oxidizing agent from passing through an electrolyte membrane and mixing.

In the related art, a method of leaving an additional electrolyte membrane at the edge of a membrane-electrode assembly other than a reaction area corresponding to an electrode area, and providing a subgasket and a gasket on an upper surface of the additional electrolyte membrane, to restrain the transfer of a fuel and an oxidizing agent has been typically applied. In addition, this typical method has the advantage that a roll-to-roll process may be applied to manufacture a membrane-electrode assembly.

However, there is a problem in that an electrolyte membrane is very expensive, and a manufacturing cost of a membrane-electrode assembly is increased because the electrolyte membrane is used for unnecessary portion other than the reaction area when the typical manufacturing method is applied.

Conventionally, in order to reduce the unnecessary use of electrolyte membranes, a method of manufacturing a unit cell of a fuel cell that has a structure saving an electrolyte membrane has been developed. For example, a method of reducing the use of an electrolyte membrane by using an electrode membrane sheet cut into a unit form with electrode catalyst layers formed on both surfaces of the electrolyte membrane has been reported.

However, the structure saving an electrolyte membrane as described above has new problems. In FIG. 1A, a cross-sectional shape of a membrane-electrode assembly manufactured by the typical method is illustrated. In FIG. 1B, a cross-sectional shape of a membrane-electrode assembly having a structure saving an electrolyte membrane is illustrated. Comparing the two shapes illustrated in FIGS. 1A and 1B, there is a difference in that an electrolyte membrane of the membrane-electrode assembly in FIG. 1A is exposed to the outside, whereas an electrolyte membrane of the membrane-electrode assembly in FIG. 1B is blocked by a subgasket and is not exposed to the outside.

In other words, edges of the structure saving an electrolyte membrane are blocked by the subgasket, so that moisture will be accumulated in a step junction portion of the subgasket. The accumulated moisture may damage the subgasket and a junction portion of the electrolyte membrane, or may form blisters by penetrating a junction portion between the subgaskets. The blisters thus formed block flow paths of the fuel and the oxidizing agent, thereby deteriorating the performance of the fuel cell.

In addition to the above problems, in order to manufacture a membrane-electrode-subgasket assembly having an structure saving an electrolyte membrane, a portion in which only the membrane-electrode assembly exists is necessarily formed, and there is a problem in that handling the membrane-electrode assembly is difficult because the membrane-electrode assembly is thin and is easily affected by humidity.

SUMMARY

In one preferred aspect, provided is a method of continuously manufacturing a membrane-electrode-subgasket assembly on a basis of the roll-to-roll process.

In one preferred aspect, provided is a method of manufacturing a membrane-electrode-subgasket assembly capable of reducing the use of an electrolyte membrane during manufacturing on a basis of the roll-to-roll process.

Further provided is a membrane-electrode-subgasket assembly having a structure in which water generated by charging and discharging of electricity may be easily discharged to the outside through an electrolyte membrane.

The objectives of the present invention are not limited to that described above. The objectives of the present invention will be clearly understood from the following description and can be implemented by the means defined in the claims and combinations thereof.

In one aspect, provided is a method of manufacturing an asymmetrical membrane-electrode-subgasket assembly, the method including: providing a membrane-electrode assembly sheet including catalytic layers each of which is provided on a first surface and a second surface; manufacturing a first assembly sheet by attaching a first substrate sheet to the first surface of the membrane-electrode assembly sheet; separating a first assembly from the first assembly sheet; and bonding the first assembly to a second substrate sheet.

Opening portions may be formed on the first substrate sheet and the second substrate sheet, respectively, and the opening portions may be formed by respective punching devices.

The opening portion of the first substrate sheet and the opening portion of the second substrate sheet may be positioned on the catalytic layers of the membrane-electrode assembly sheet, respectively.

The opening portion of the first substrate sheet may be formed by punching the first substrate sheet, the opening portion of the second substrate sheet may be formed by punching the second substrate sheet, and the first assembly may be formed by simultaneously punching the first substrate sheet and the membrane-electrode assembly sheet simultaneously.

The first assembly may include a membrane-electrode assembly separated from the membrane-electrode assembly sheet and a first substrate separated from the first substrate sheet. A shape of the membrane-electrode assembly and a shape of the first substrate may be the same.

The first assembly may be attached to the second substrate sheet, with a membrane-electrode assembly being positioned between the first assembly and the second substrate sheet.

The first assembly may be attached to the second substrate sheet such that an opening portion of a first substrate is symmetrical to an opening portion of the second substrate sheet, with a membrane-electrode assembly being interposed there between.

The separating of the first assembly from the first assembly sheet may include: forming an outer portion cutting line by punching the first assembly sheet; and separating the first assembly by adsorbing a surface inside the outer portion cutting line of the first assembly sheet.

The outer portion cutting line may be formed by a punching device, and the adsorbing may be performed by an adsorbing device.

The method may further include: separating a second substrate after the bonding of the first assembly to the second substrate sheet.

The separated second substrate may include the first assembly.

An area of the second substrate and an area of a first substrate may be not the same.

In an aspect, provided is an asymmetrical membrane-electrode-subgasket assembly, which includes: a first substrate comprising an opening portion; a second substrate comprising an opening portion; and a membrane-electrode assembly interposed between the first substrate and the second substrate, the membrane-electrode assembly having catalytic layers on a first surface and a second surface thereof where an area of the first substrate and an area of the second substrate are not the same.

The catalytic layers of the membrane-electrode assembly may be exposed to an outside through the opening portions.

The second substrate may further include a manifold portion provided at a position at which the manifold portion may be neither overlapping with the membrane-electrode assembly nor with the first substrate.

The area of the second substrate may be greater than the area of the first substrate.

Side surfaces of the membrane-electrode assembly may be neither closed by the first substrate nor by the second substrate.

In an aspect, provided is fuel cell including the asymmetrical membrane-electrode-subgasket assembly described herein.

Further provided is a vehicle including the asymmetrical membrane-electrode-subgasket assembly or a fuel cell described herein.

According to various exemplary embodiments of the present invention, a method of continuously manufacturing a membrane-electrode-subgasket assembly using a roll-to-roll process may be realized.

According to various exemplary embodiments of the present invention, a method of manufacturing a membrane-electrode-subgasket assembly capable of reducing the use of an electrolyte membrane during manufacturing using a roll-to-roll process may be realized.

According to various exemplary embodiments of the present invention, a membrane-electrode-subgasket assembly having a structure in which water generated by charging and discharging of electricity may be easily discharged to the outside through an electrolyte membrane may be realized.

The effects of the present invention are not limited to the aforementioned effects. The effects of the present invention are to be understood to include all the effects capable of being inferred from the following explanation.

Other aspects of the invention are disclosed infra.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1A:
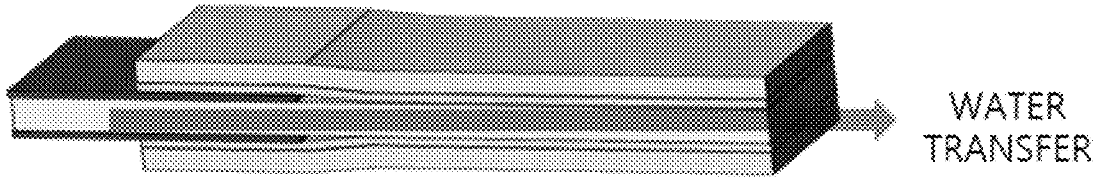
(PRIOR ART) FIG. 1A
FIG. 1A shows a cross-sectional shape of a membrane-electrode assembly manufactured by a conventional method.
Figure 1B:
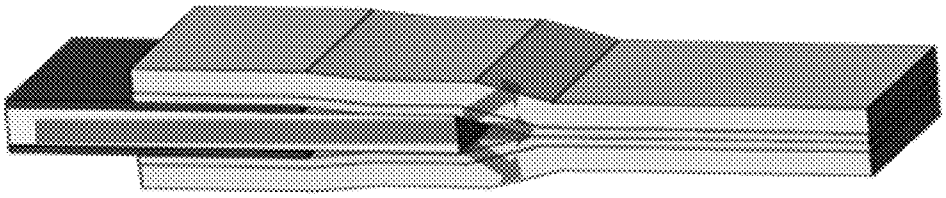
(PRIOR ART) FIG. 1B
FIG. 1B shows a cross-sectional shape of a membrane-electrode assembly having a structure saving an electrolyte membrane.

The objectives, other objectives, features and advantages of the present invention will be easily understood through the following detailed description of specific exemplary embodiments and the attached drawings. However, the present invention is not limited to the exemplary embodiments and may be embodied in other forms. On the contrary, the exemplary embodiments are provided so that the invention of the present invention may be completely and fully understood by those of ordinary skill.

In the attached drawings, like numerals are used to represent like elements. In the drawings, the dimensions of the elements are enlarged for easier understanding of the present invention. Although the terms first, second, etc. may be used to describe various elements, these elements should not be limited by the terms. The terms are used only to distinguish one element from another. For example, a first element can be termed a second element and, similarly, a second element can be termed a first element, without departing from the scope of the present invention. A singular expression includes a plural expression unless the context clearly indicates otherwise.

In the present invention, the terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

Unless specified otherwise, all the numbers, values, and/or expressions representing the amount of components, reaction conditions, polymer compositions or mixtures are approximations reflecting various uncertainties of measurement occurring in obtaining those values and should be understood to be modified by "about". Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Also, unless specified otherwise, all the numerical ranges disclosed in the present invention are continuous and include all the values from the minimum values to the maximum values included in the ranges. In addition, when the ranges indicate integers, all the integers from the minimum values to the maximum values included in the ranges are included unless specified otherwise.

The ranges of variables described in the present invention are to be understood to include all the values within the specified end points of the ranges. For example, a range of "5-10" is to be understood to include not only the values 5, 6, 7, 8, 9 and 10, but also any values within subranges such as 6-10, 7-10, 6-9, 7-9, etc. and to include any values between appropriate integers in the specified ranges such as 5.5, 6.5, 7.5, 5.5-8.5, 6.5-9, etc. In addition, for example, a range of "10-30%" is to be understood to include not only the integers 10%, 11%, 12%, 13%, . . . , 30%, but also any values within subranges such as 10%-15%, 12%-18%, 20%-30%, etc. and to include any values between appropriate integers in the specified ranges such as 10.5%, 15.5%, 25.5%, etc.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention relates to a method of manufacturing a membrane-electrode-subgasket assembly and an asymmetrical membrane-electrode-subgasket assembly manufactured thereby.

Hereinafter, the method of manufacturing a membrane-electrode-subgasket assembly of the present invention will be described with reference to FIGS. 2 to 8, and the membrane-electrode-subgasket assembly of the present invention will be described with reference to FIGS. 9 to 12.

Method of Manufacturing Membrane-Electrode-Subgasket Assembly

The method of manufacturing the membrane-electrode-subgasket assembly 30 includes supplying a membrane-electrode assembly sheet 111 including catalytic layers 1 provided on a first surface and a second surface, manufacturing a first assembly sheet 100 by attaching a first substrate sheet 101 to a first surface of the membrane-electrode assembly sheet 111, separating a first assembly 10 from the first assembly sheet 100, and bonding the first assembly 10 to a second substrate sheet 102. In particular, the method is performed in a roll-to-roll manner in which all processes are continuously proceeding.

Figure 2:
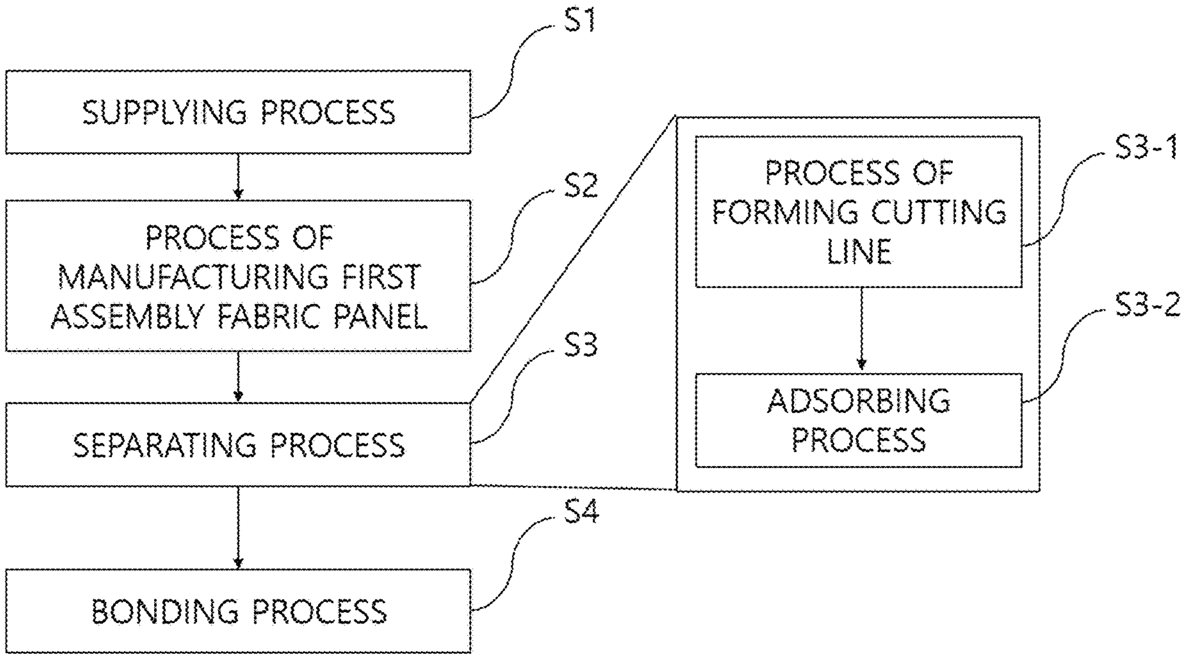
FIG. 2 shows a flowchart illustrating a method of manufacturing a membrane-electrode-subgasket assembly according to an exemplary embodiment of the present invention.
Figure 3:
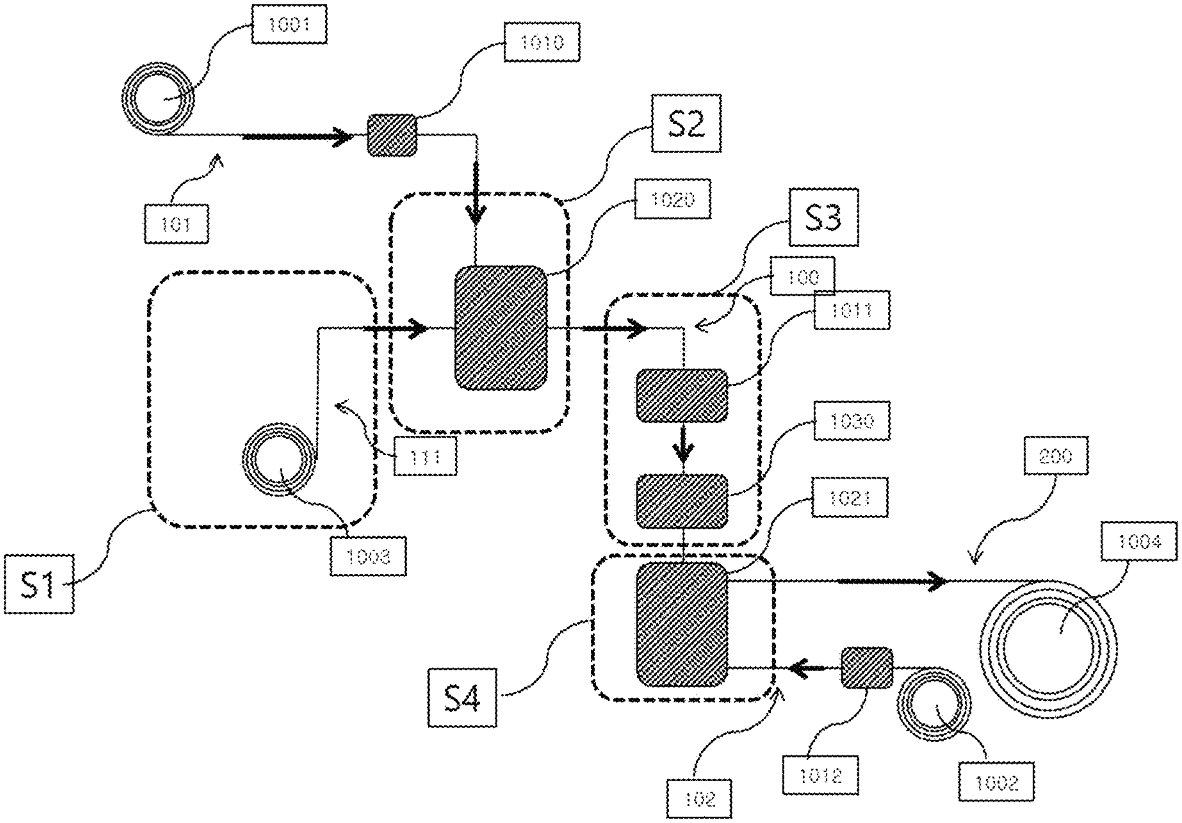
FIG. 3 shows an exemplary process view illustrating an exemplary method of manufacturing a membrane-electrode-subgasket assembly according an exemplary embodiment of the present invention.
Figure 4:
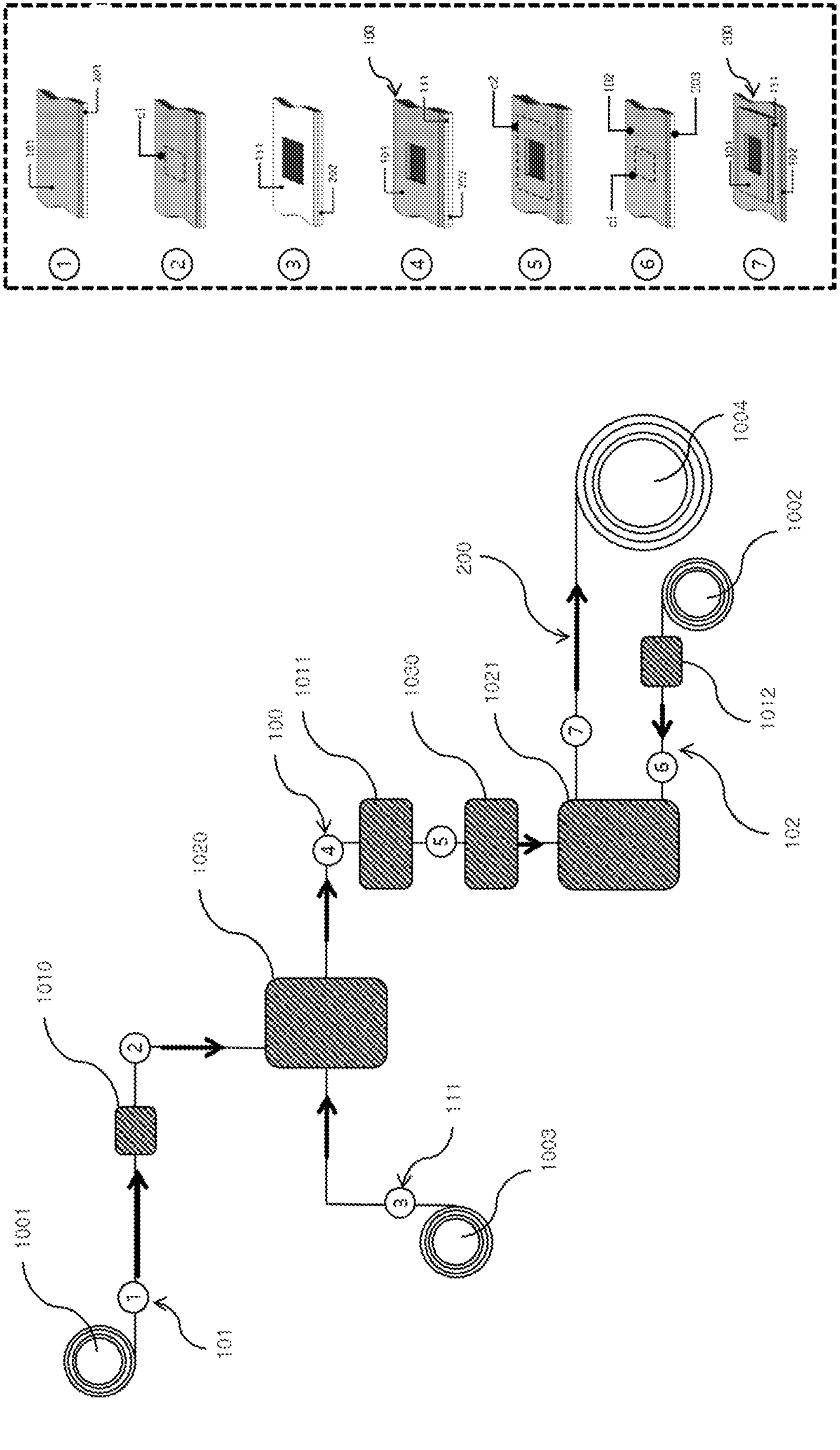
FIG. 4 shows an exemplary process view illustrating the method of manufacturing a membrane-electrode-subgasket assembly and changes of moving sheets.

Hereinafter, the process of manufacturing the membrane-electrode-subgasket assembly 30 according to an exemplary embodiment of the present invention will be described with reference to a flow chart as shown in FIG. 2 and a process view as shown in FIGS. 3 and 4.

Supplying Process S1

The supplying process S1 is a process of supplying the membrane-electrode assembly sheet 111 that includes the catalytic layers 1 provided on a first and a second surfaces.

The membrane-electrode assembly sheet 111 is provided by a membrane-electrode assembly sheet supply roll 1003. For example, the membrane-electrode assembly sheet 111 is provided by being attached to a protective film 202 that is capable of supporting and protecting the membrane-electrode assembly sheet 111.

The protective film 202 suffices to be a release paper that may be easily removed and have some tension, and is not particularly limited in the present invention.

A material of the membrane-electrode assembly sheet 111 may be a conventional electrolyte membrane material that may be used in the field of fuel cells, and is not particularly limited in the present invention.

The catalytic layers 1 are attached to an upper surface and a lower surface of the membrane-electrode assembly sheet 111, and a plurality of catalytic layers 1 are attached to the both surfaces of the membrane-electrode assembly sheet 111, respectively. The plurality of catalytic layers 1 attached to the first surface of the membrane-electrode assembly sheet 111 are spaced apart from each other by a predetermined distance.

Process S2 of Manufacturing First Assembly Sheet

The process S2 of manufacturing the first assembly sheet is a process of manufacturing the first assembly sheet 100 by attaching the first substrate sheet 101 to the first surface of the membrane-electrode assembly sheet 111.

This process includes attaching the first substrate sheet 101 provided by a first substrate sheet supply roll 1001 to the first surface of the membrane-electrode assembly sheet 111. For example, the first substrate sheet 101 is provided attached to a protective film 201 that is capable of protecting and supporting the first substrate sheet 101. Particularly, the first substrate sheet 101 may be partially punched by a punching device 1010 before the first substrate sheet 101 is attached to the membrane-electrode assembly sheet 111. An opening portion cutting line C1 is formed on the first substrate sheet 101 by the punching. Next, in the process of attaching the first substrate sheet 101 to the membrane-electrode assembly sheet 111, a portion of the first substrate sheet 101 is removed in the shape of the opening portion cutting line C1, so that an opening portion 2 is formed. As shown in FIG. 4, the opening portion cutting line C1 is formed after the first substrate sheet 101 passes through the punching device 1010. Particularly, the protective film 201 may not be punched.

Figure 5:
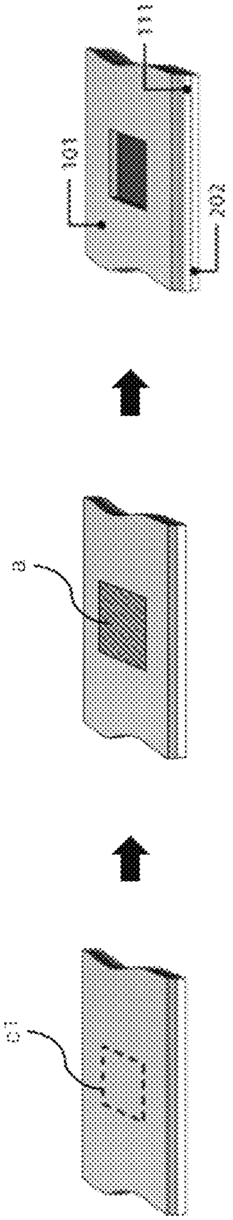
FIG. 5 shows an exemplary process of removing a scrap portion from a first substrate sheet.

As shown in FIG. 5, the portion that is removed from the first substrate sheet 101 may be referred to as a scrap portion A. The opening portion 2 is formed when the scrap portion A is removed from the first substrate sheet 101.

The shape of the scrap portion A is the same as the shape of the opening portion 2. At this time, the opening portions 2 are formed in plural on the first substrate sheet 101, and the opening portions 2 are spaced apart from each other by a predetermined distance.

The first substrate sheet 101 on which the opening portion cutting line C1 is formed is bonded to the membrane-electrode assembly sheet 111 by a press device 1020, so that the first assembly sheet 100 is manufactured. For example, the first substrate sheet 101 is positioned on and bonded to the membrane-electrode assembly sheet 111 so that the opening portions 2 correspond to each of the catalytic layers 1 that are formed on the membrane-electrode assembly sheet 111.

A portion of an area of the catalytic layer 1 included on the membrane-electrode assembly sheet 111 is exposed to the outside through the opening portion 2 of the first substrate sheet 101. An area of the catalytic layer 1 may be greater than an area of the opening portion 2 of the first substrate sheet 101.

The scrap portion A and the protective film 201 of the first substrate sheet 101 may be removed before the sheet substrate 101 reaches the press device 1020. The first substrate sheet 101 from which the scrap portion A and the protective film 201 have been removed is bonded to and moved with the membrane-electrode assembly sheet 111 that is supported on the protective film 202.

The press device 1020 in the present invention is not particularly limited. The press device may be a conventional press device that is used in the field of manufacturing of membrane-electrode assembly for fuel cells, and is capable of bonding the first substrate sheet 101 to the membrane-electrode assembly sheet 111.

Separating Process S3

The separating process S3 is a process of separating the first assembly 10 from the first assembly sheet 100.

In particular, the separating process S3 includes a process of forming an opening portion cutting line C2 by punching the first assembly sheet 100, and a process of separating the first assembly 10 by adsorbing a surface inside the opening portion cutting line C2.

Process S3-1 of Forming Cutting Line

The process S3-1 of forming the cutting line is a process of forming the opening portion cutting line C2 by punching the first assembly sheet 100.

Figure 6:
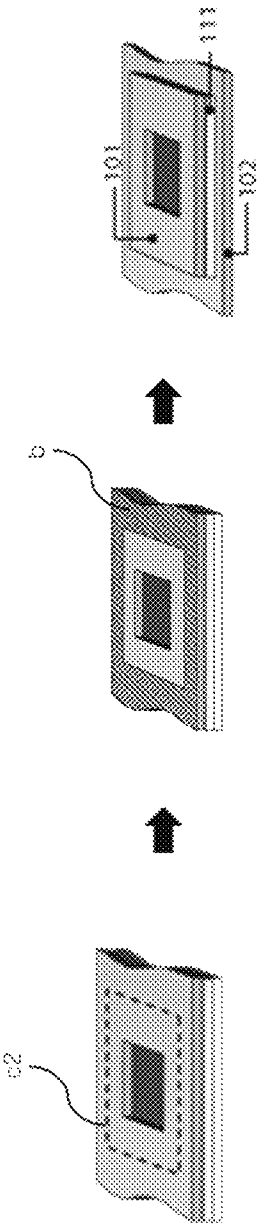
FIG. 6 shows an exemplary process of removing a scrap portion from a first assembly sheet.

The opening portion cutting line C2 is formed by being partially punched by a punching device 1011 in the same manner as the process of forming the opening portion cutting line C2 on the first substrate sheet 101. However, there is a difference in that the opening portion cutting line C2 is simultaneously formed on the membrane-electrode assembly sheet 111 and the first sheet 101. In addition, as shown in FIGS. 4 and 6, there are differences in that the opening portion cutting line C2 is formed to be spaced apart from the opening portion 2, and a scrap portion B corresponds to the outer edges on a basis of the opening portion cutting line C2.

As described above, since the opening portion cutting line C2 is formed at the same position on the first substrate sheet 101 and on the membrane-electrode assembly sheet 111, a shape of a first substrate 11 and a shape of a membrane-electrode assembly 20 that will be obtained after are the same.

The protective film 202 supporting the first assembly sheet 100 may not be punched.

Adsorbing Process S3-2

The adsorbing process S3-2 is a process of separating the first assembly 10 by adsorbing the first assembly 10 from the first assembly sheet 100 by an adsorbing device 1030.

The first assembly 10 is adsorbed by the adsorbing device 1030 and separated from the protective film 202 while removing the scrap portion B on the basis of the opening portion cutting line C2.

Particularly, the first assembly 10 includes a membrane-electrode assembly 20 that is separated from the membrane-electrode assembly sheet 111, and includes a first substrate 11 that is separated from the first substrate sheet 101 and bonded to the first surface of the membrane-electrode assembly 20. At this time, the first substrate 11 and the membrane-electrode assembly 20 have the same end portions and shapes.

The adsorption device 1030 may include an adsorbing roller, but is not limited thereto. The adsorbing device 1030 may be a device that is capable of separating the first assembly 10 from the first assembly sheet 100 effectively. For example, the device may use an electrostatic force and an adhesive.

In particular, the first assembly 10 may be detached by the adsorbing roller, and may be bonded to the second substrate sheet 102 that is supplied by the adsorbing roller at the same time. At this time, the adsorbing roller may include a vacuum die, but is not limited thereto.

Bonding Process S4

The bonding process S4 is a process of bonding the first assembly 10 to the second substrate sheet 102 by using a press device 1021. The bonding process S4 includes bonding the first assembly 10, which is separated from the first assembly sheet 100 and moves, to the second assembly sheet 102 that is supplied from a second substrate sheet supply roll 1002. At this time, separation of the first assembly 10 and bonding the first assembly 10 to the second substrate 12 may be performed independently or may be performed simultaneously.

The first assembly 10 is attached to the second substrate sheet 102, with the membrane-electrode assembly 20 being positioned between the first assembly 10 and the second substrate sheet 102. In particular, the surface of the first assembly 10 from which the protective film 202 is removed faces the second substrate sheet 102, and the first assembly 10 is bonded to the second substrate sheet 102.

The second substrate sheet 102 is provided by a second substrate sheet supply roll 1002. The second substrate sheet 102 is provided attached to a protective film 203 that is capable of protecting and supporting the second substrate sheet 102. The second substrate sheet 102 may be partially punched by a punching device 1012 before the first assembly 10 is attached to the second substrate sheet 102. The opening portion cutting line C1 is formed on the second substrate sheet by the punching. Before the second substrate sheet 102 is bonded to the first assembly 10, a portion of the second substrate sheet 102 is removed in the shape of the opening portion cutting line C1, so that the opening portion 2 is formed. As shown in FIG. 4, it can be seen that the opening portion cutting line C1 is formed after the second substrate sheet 102 passes through the punching device. The protective film 203 may not be punched.

The shape of the scrap portion B is the same as the shape of the opening portion 2. The opening portions 2 may be formed in plural on the second substrate sheet 102, and the opening portions 2 may be spaced apart from each other by a predetermined distance. However, unlike the first substrate sheet 101, the second substrate sheet 102 may further include a manifold portion 3.

Figure 7:
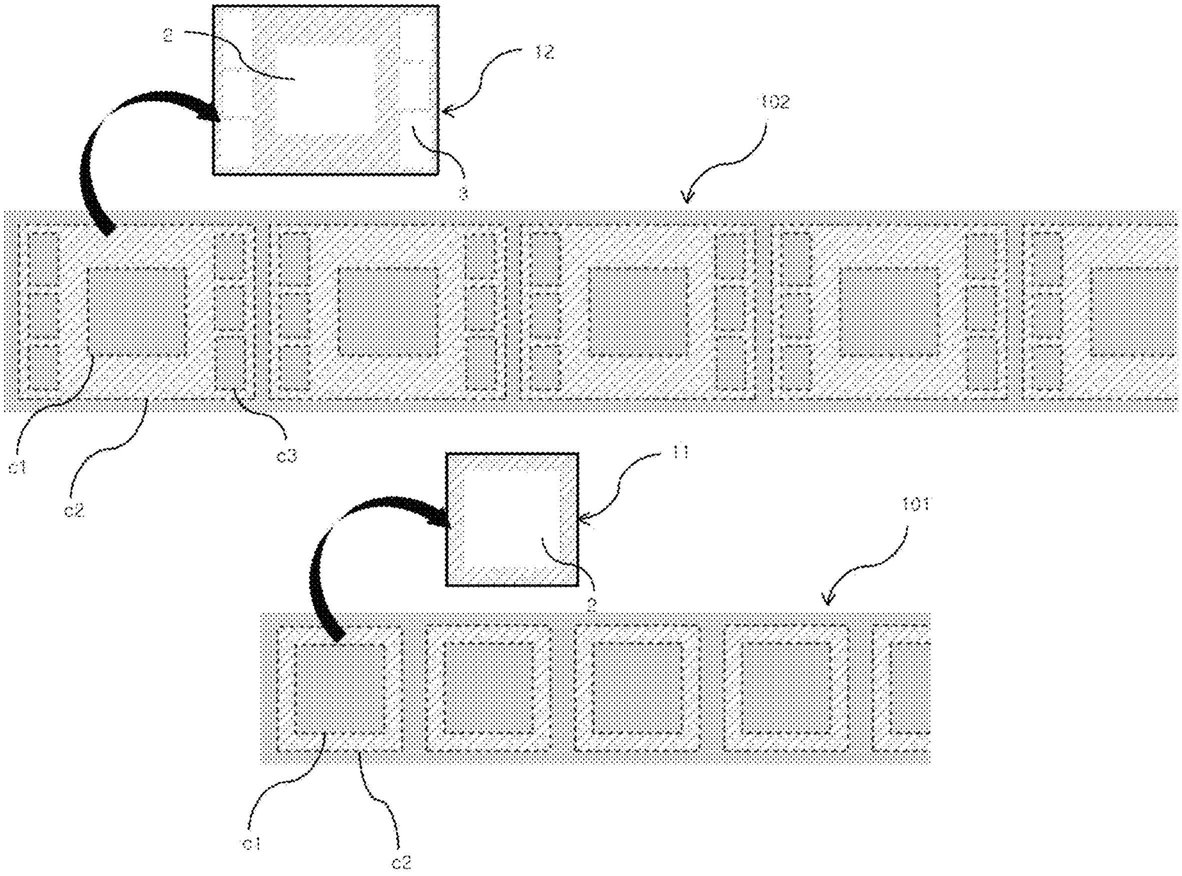
FIG. 7 shows an exemplary arrangement of first substrates on the first substrate sheet and an arrangement of second substrates on a second substrate sheet.
Figure 8:
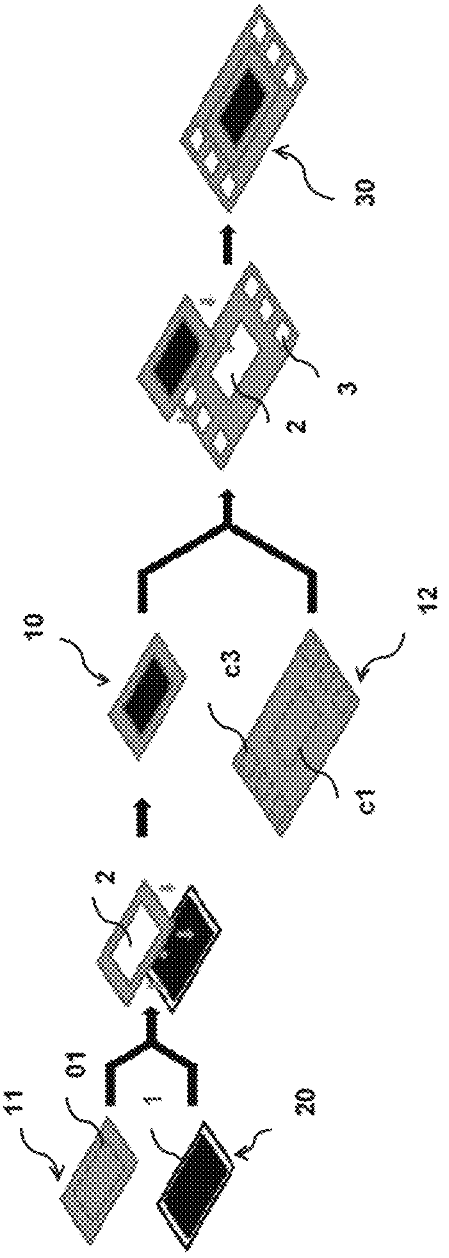
FIG. 8 shows an exemplary process of manufacturing the membrane-electrode-subgasket assembly by using the first substrate, the second substrate, and a membrane-electrode assembly.
Figure 9:
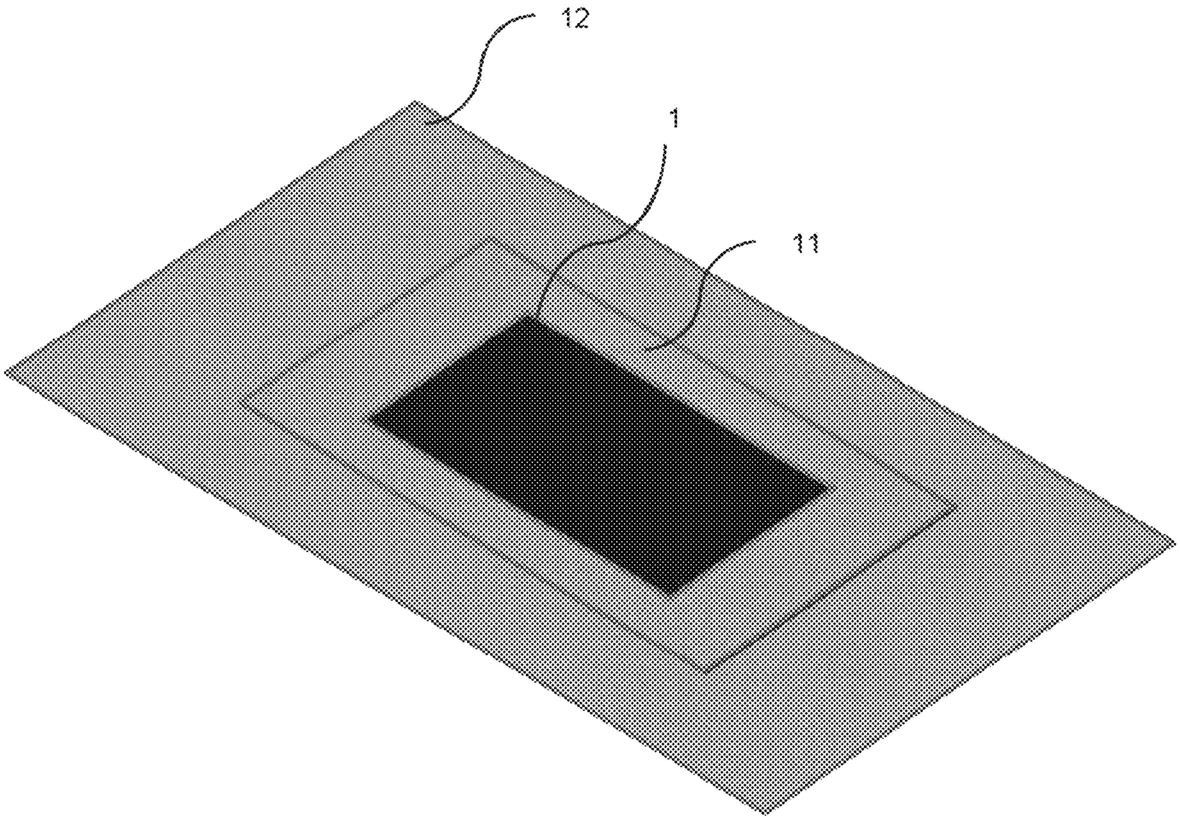
FIG. 9 shows an exemplary assembled state of a membrane-electrode-subgasket assembly of the present invention.

As shown in FIG. 7, the opening portion 2 is formed on the second substrate 12 in the same manner as the first substrate 11, but an overall area of the opening portion 2 at the second substrate 12 is greater than an area of the opening portion 2 at the first substrate 11, and the additional manifold portion 3 is further included.

When the opening portion cutting line C1 is formed on the second substrate sheet 102, a manifold portion cutting line C3 may be formed additionally. At this time, the scrap portion B includes surfaces inside the manifold portion as well as the surface inside the opening portion cutting line C1.

The second substrate sheet 102 is bonded to the first assembly 10 by a press device 1021, so that a membrane-electrode-subgasket sheet 200 is manufactured. The first assembly 10 is positioned on and bonded to the second substrate sheet 102 so that the opening portion 2 of the second substrate sheet 102 corresponds to each of the catalytic layers 1 that are formed on the first surface of the first assembly 10.

A portion of a second surface area of the catalytic layer 1 is exposed to the outside through the opening portion 2 of the second substrate sheet 102. The area of the catalytic layer 1 may be greater than the area of the opening portion 2 of the second surface sheet 102.

The opening portion 2 included in the second substrate sheet 102 may be symmetrical to the opening portion 2 of the first substrate 11 with respect to the membrane-electrode assembly 20 that is included in the first assembly 10 and interposed between the opening portions 2.

The manufactured membrane-electrode-subgasket sheet 200 may be collected through a collect roller 1004, or the membrane-electrode-subgasket assembly 30 may be obtained by separating the second substrate 12 including the first assembly 10 from the manufactured membrane-electrode-subgasket sheet 200.

Second Substrate Separating Process S5

The second substrate separating process S5 is a process of obtaining the membrane-electrode-subgasket assembly 30 by separating the second substrate 12 including the first assembly 10 from the membrane-electrode-subgasket sheet 200. This process includes separating the second substrate 12 and the first assembly 10 bonded to the second assembly 12 by cutting the second substrate sheet 102 along the opening portion cutting line C2.

As shown in FIG. 7, punching is performed along the opening portion cutting line C2 on the second substrate sheet 102, so that the second substrate 12 may be separated.

In the same manner as described above, the membrane-electrode-subgasket assembly 30 including the second substrate 12 and the first assembly 10 bonded to the second substrate 12 may be obtained.

The manufacturing process of the membrane-electrode-subgasket assembly 30 of the present invention is illustrated in a simplified manner in FIG. 7. As shown in FIG. 7, to summarize the manufacturing process of the present invention, the first assembly 10 is manufactured by bonding the membrane-electrode-assembly 20 to the first substrate 11 on which the opening portion 2 is formed, the first assembly 10 is bonded to the second substrate 12 on which the opening portion 2 and the manifold portion 3 are formed, and the membrane-electrode-subgasket assembly 30 having an asymmetrical subgasket is manufactured.

Membrane-Electrode-Subgasket Assembly

The asymmetrical membrane-electrode-sub gasket assembly 30 includes the first substrate 11 including an opening portion, the second substrate 12 including an opening portion 2, and the membrane-electrode assembly 20 on which both sides are provided with the catalytic layers 1, and the asymmetrical membrane-electrode-subgasket assembly 30 is configured such that the area of the first substrate 11 and the area of the second substrate 12 are not the same. The area of the figure drawn along the side of the first substrate 11 and the area of the figure drawn along the side of the second substrate 12 are not the same.

The components of the membrane-electrode-sub gasket assembly 30 of the present invention will be described with reference to FIGS. 9 to 12.

Membrane-Electrode Assembly

The membrane-electrode-subgasket assembly 30 includes the membrane-electrode assembly 20 interposed between the first substrate 11 and the second substrate 12. The membrane-electrode assembly 20 includes the electrolyte membrane and the catalytic layers that are provided on both sides of the electrolyte membrane.

First Substrate

The first substrate 11 of the present invention includes the opening portion 2, and is bonded to the first surface of the membrane-electrode assembly 20. At this time, the catalytic layer 1 may be exposed to the outside through the opening portion 2 of the first substrate 11.

The shape of the first substrate 11 is the same as the shape of the membrane-electrode assembly 20. In particular, the first substrate sheet 101 and the membrane-electrode assembly sheet 111 are bonded to each other, and the opening portion cutting line C2 is simultaneously formed. The outer shape of the first substrate 11 and the outer shape of the membrane-electrode assembly 20 are the same.

Figure 11:
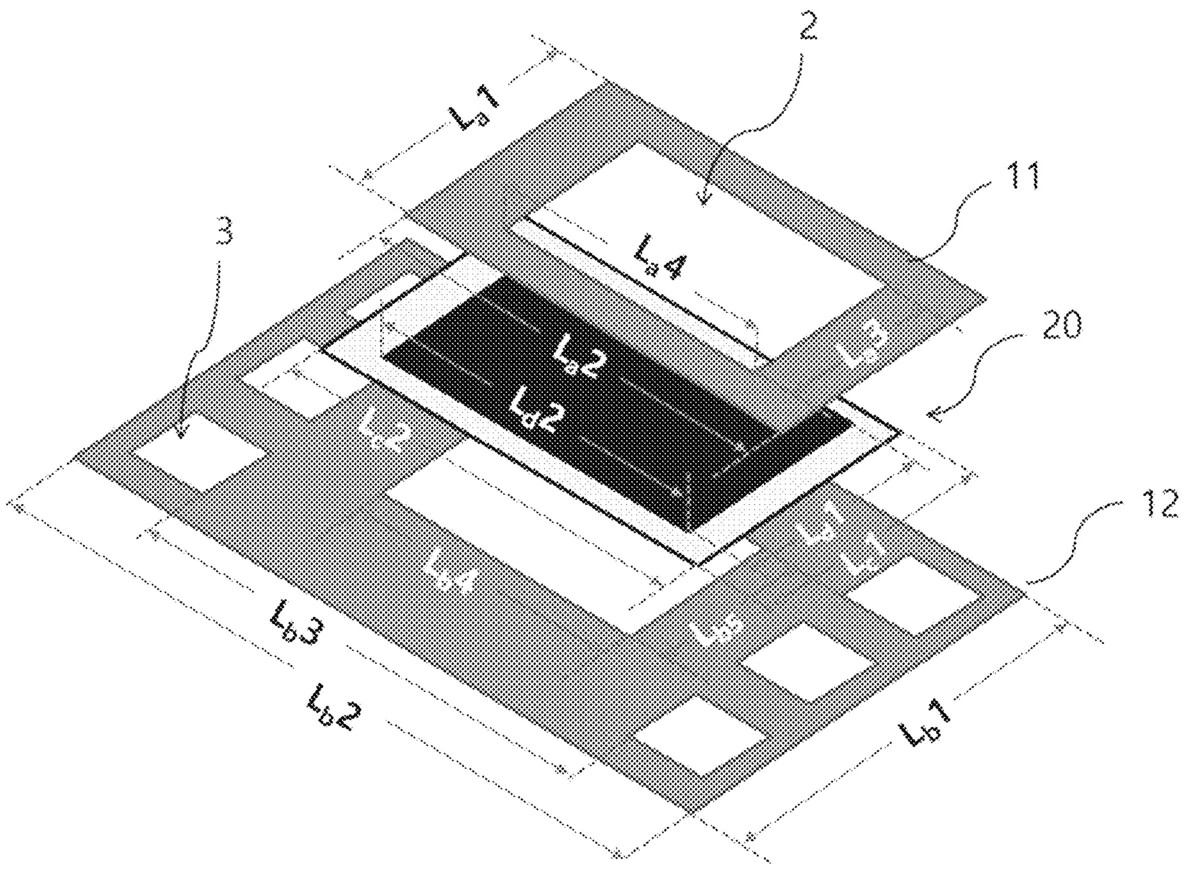
FIG. 11 shows an exemplary membrane-electrode-subgasket assembly according to an exemplary embodiment of the present invention.

As shown in FIG. 11, the length of Lal of the first substrate 11 and the length of $L_c$1 of the membrane-electrode assembly 20 have the same length, and the length of $L_a$2 of the first substrate 11 and the length of $L_c$2 of the membrane-electrode assembly 20 have the same length. The length of $L_d$2 of the catalytic layer 1 that is included in the membrane-electrode assembly 20 may be longer than the length of $L_a$4 of the opening portion 2 that is included in the first substrate 11, and the length of $L_d$1 may be longer than the length of $L_a$3.

Figure 10:
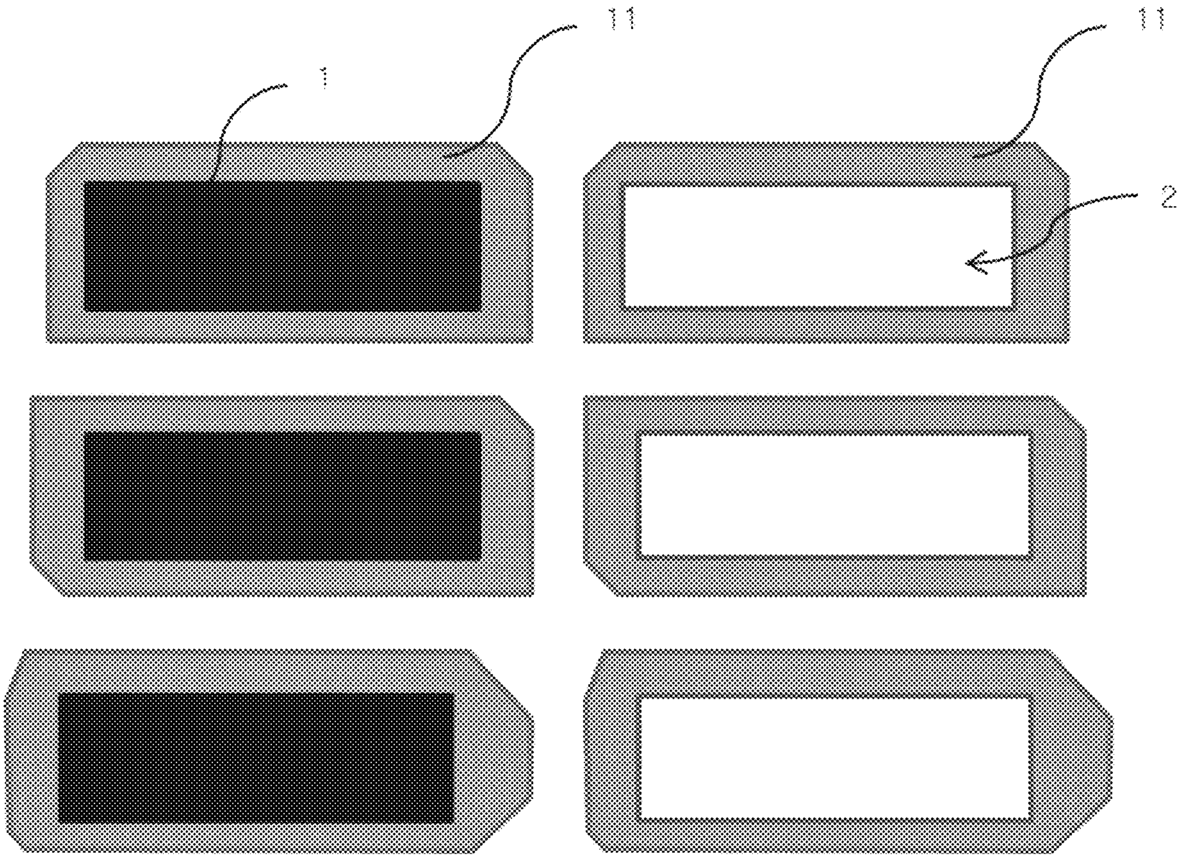
FIG. 10 shows various exemplary shapes of the first substrate according to an exemplary embodiment of the present invention.

The shape of the first substrate 11 of the present invention is not particularly limited, and may have various shapes as shown in FIG. 10.

Second Substrate

The second substrate 12 of the present invention may further include a manifold portion 3 in addition to the opening portion 2.

The area of the second substrate 12 may be greater than the area of the first substrate 11.

As shown in FIG. 11, the length of $L_a$4 of the first substrate 11 and the length of $L_b$4 of the second substrate 12 may have the same length, and the length of $L_a$3 and the length of $L_b$5 may have the same length.

The length of $L_b$2 of the second substrate 12 may be longer than the length of $L_a$2 of the first substrate 11, and the length of $L_a$2 of the first substrate 11 may be no longer than the length of $L_b$3 of the second substrate 12. The length of $L_b$1 of the second substrate 12 may be longer than the length of Lal of the first substrate 11.

In the membrane-electrode-subgasket assembly 30, subgasket having an asymmetrical structure may be bonded to the upper surface and the lower surface of the membrane-electrode assembly 20, so that moisture can be easily discharged to the edge of the electrolyte membrane, thus preventing a generation of blisters inside the membrane-electrode-assembly 20.

Figure 12:
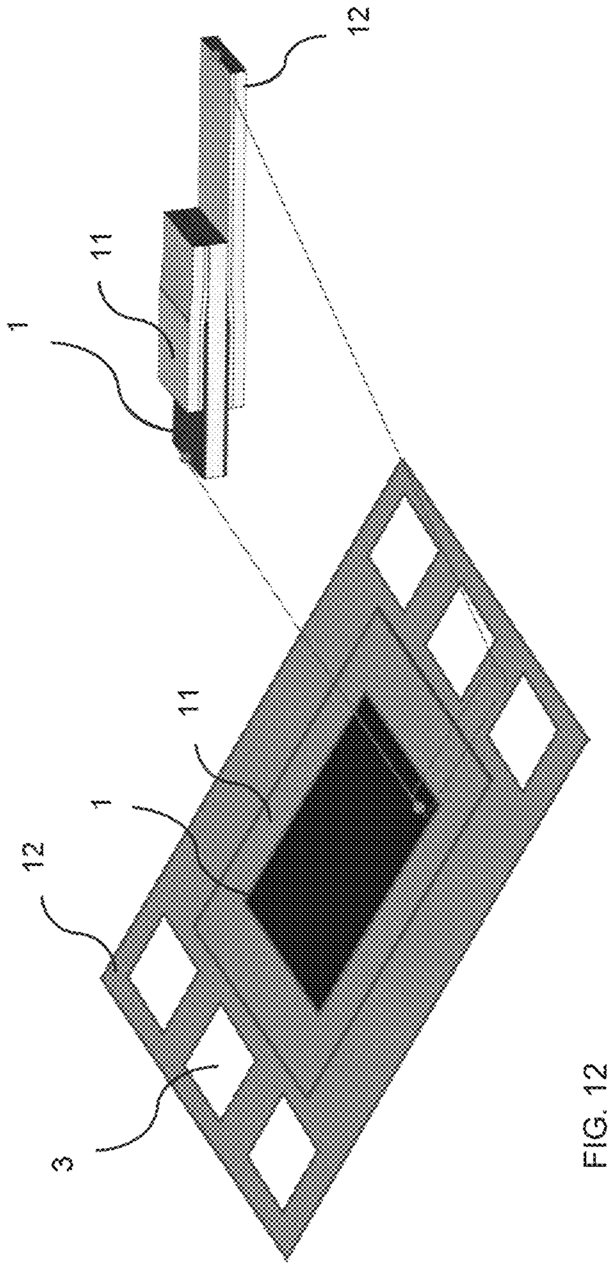
FIG. 12 shows a perspective view and a partial cross-sectional view of the membrane-electrode-subgasket assembly according to an exemplary embodiment of the present invention.

As shown by a cross-sectional view of the membrane-electrode-subgasket assembly 30 in FIG. 12, the positions of each of the outer end portions of the first substrate 11 and the membrane-electrode assembly 20 may be matched to each other, and the side surfaces of the electrolyte membrane are exposed to the outside by the area of the second substrate 12 being greater than the area of the first substrate 11.

As described above, due to the opening of the side surfaces of the electrolyte membrane, moisture accumulated on the edge of the electrolyte membrane during driving a fuel cell may be easily discharged.

Figure 13:
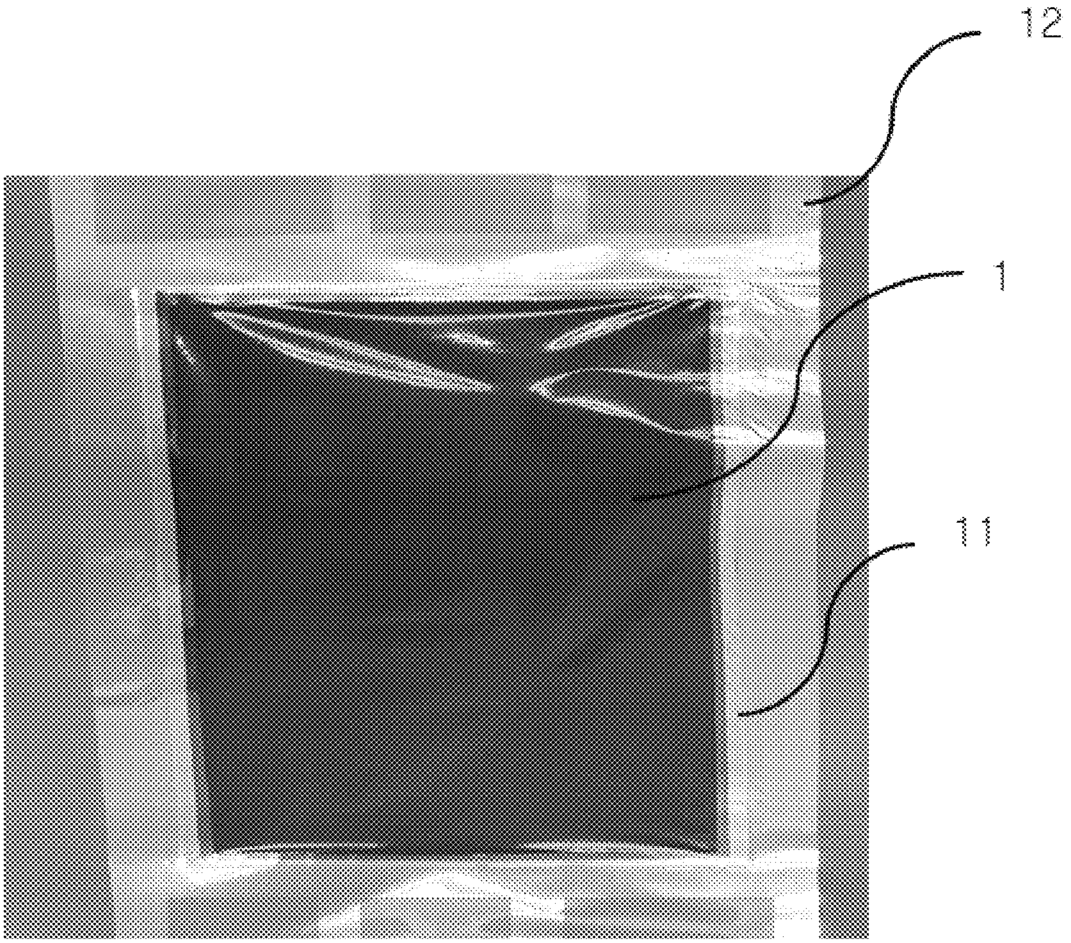
FIG. 13 shows an exemplary membrane-electrode-subgasket assembly manufactured by an exemplary embodiment of the present invention.

As shown by the actually manufactured membrane-electrode-subgasket assembly 30 shown in FIG. 13, the first substrate 11 surrounds the border of the catalytic layer 1 and is bonded to the catalytic layer 1, and the area of the first substrate 11 and the area of the second substrate 12 are different and are asymmetrical to each other.

A material of the first substrate sheet 101, a material of the second substrate sheet 102, a material of the first substrate 11 that is derived from the first substrate sheet 101, a material of the second substrate 12 that is derived from the second substrate sheet 102, and so on may be the same as a material conventionally used in a gasket or a subgasket, but not limited thereto, and suffice to be performing the same function of a gasket and a subgasket that are conventionally used.

While the present invention has been described with reference to exemplary embodiments, it is apparent to those skilled in the art that these embodiments have been described for illustrative purposes, and various changes and modifications may be made without departing from the embodiments and scope of the present invention as defined by the appended claims.

What is claimed is:

1. A method of manufacturing an asymmetrical membrane-electrode-subgasket assembly, the method comprising:
- providing a membrane-electrode assembly sheet comprising a plurality of catalytic layers that are spaced apart from each other by a predetermined distance and are attached to a first surface and a second surface of a single continuous electrolyte membrane;
- manufacturing a first assembly sheet by attaching a first substrate sheet to the first surface of the membrane-electrode assembly sheet;
- forming a first assembly by cutting the first assembly sheet in the thickness direction along an outer portion cutting line such that the first substrate sheet and the membrane-electrode assembly sheet are simultaneously cut;
- separating the first assembly from the first assembly sheet by adsorbing a surface inside the outer portion cutting line of the first assembly sheet, wherein the separated first assembly comprises a membrane-electrode assembly separated from the membrane-electrode assembly sheet and a first substrate separated from the first substrate sheet; and
- bonding the separated first assembly to a second substrate sheet;
- wherein the first substrate and the membrane-electrode assembly have the same end portion and shapes.

2. The method of claim 1, wherein opening portions are formed on the first substrate sheet and the second substrate sheet, respectively, and the opening portions are formed by cutting the first substrate sheet and second substrate sheet with respective punching devices.

3. The method of claim 2, wherein the opening portion of the first substrate sheet and the opening portion of the second substrate sheet are positioned on the catalytic layers of the membrane-electrode assembly sheet, respectively.

4. The method of claim 2, wherein the opening portion of the first substrate sheet is formed by cutting the first substrate sheet, the opening portion of the second substrate sheet is formed by cutting the second substrate sheet.

5. The method of claim 1, wherein the first assembly is attached to the second substrate sheet, with a membrane-electrode assembly being positioned between the first assembly and the second substrate sheet.

6. The method of claim 1, wherein the first assembly is attached to the second substrate sheet such that the opening portion of a first substrate is symmetrical to an opening portion of the second substrate sheet with a membrane-electrode assembly being interposed there between.

7. The method of claim 1, wherein the outer portion cutting line is formed by a punching device, and the adsorbing is performed by an adsorbing device.

8. The method of claim 1, further comprising:
- separating a second substrate after the bonding of the first assembly to the second substrate sheet.

9. The method of claim 8, wherein the separated second substrate comprises the first assembly.

10. The method of claim 8, wherein an area of the second substrate and an area of a first substrate are not the same.

* * * * *